S. B. NASH.
Improvement in Extension Table Slides.

No. 115,087.                                            Patented May 23, 1871.

Witnesses:
F. W. Howard
L. P. Gale

Stephen B. Nash, Inventor.
by his attorney L. P. Gale 115,087

UNITED STATES PATENT OFFICE.

STEPHEN B. NASH, OF BUFFALO, NEW YORK, ASSIGNOR TO AUSTIN E. MESSENGER, OF SAME PLACE.

IMPROVEMENT IN EXTENSION-TABLE SLIDES.

Specification forming part of Letters Patent No. 115,087, dated May 23, 1871.

Be it known that I, STEPHEN B. NASH, of the city of Buffalo, county of Erie and State of New York, have invented a new Method of Constructing Extension Tables, of which the following is a clear and sufficient description:

The nature of the invention consists in the mode of making the slides. The slides consist of two parts: First, the wooden slides provided with pairs of parallel dovetailed grooves; and secondly, a metal portion, denominated double angle-irons, designed to slide in the said grooves.

Figure 1:
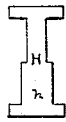
Figure 2:
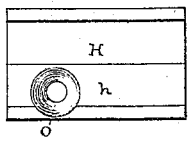
Figure 4:
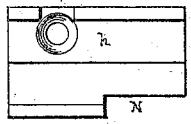
Figure 3:
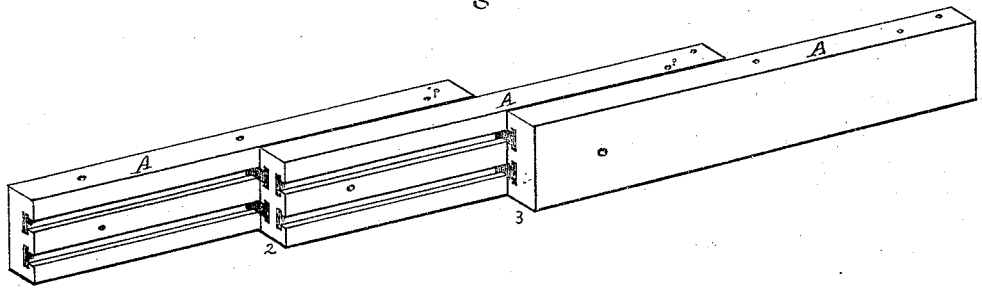
Figure 5:
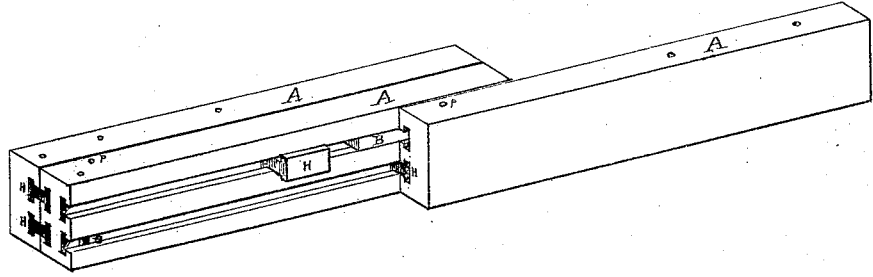
Figure 6:
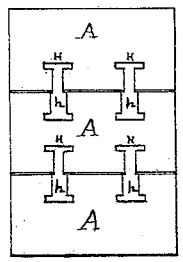
Figure 7:
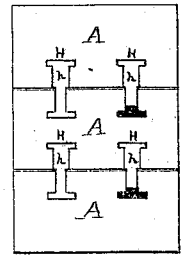

In the accompanying drawing, let Figure 1 represent a side or edge view of the double angle-iron H; Fig. 2, a front view of the same angle-iron, showing hole O in the lower part; Fig. 3, a perspective view of the three wooden slides lying on their edges, and their grooves arranged face to face, numbered 1 2 3; Fig 4, the same front view of the double angle-iron, shown in Fig. 2, except that a rectangular piece has been removed from the right lower corner, leaving a recess, N, to allow the pin e to pass through the wooden slide without obstruction; Fig. 5, the slides lying on their sides—the nearest drawn back to show the angle-iron H pushed out, and the bumper B partly protruded from its place to show its relative position in the grooves. There is a bumper between the first and second slides. There is another between the second and third slides to stop the back movement at the point designed by striking against the pins in holes e e. Fig. 6 represents an end view of the wooden slides on the left; Fig. 7, an end view of the wooden slides as seen on the right, the former of these showing the sides or ends of four double angle-irons just ready to project from the grooves seen in the end of the slide. The latter, or Fig. 7, shows view of the right end, exhibiting the four remaining angle-irons, two of which have the lower corner recessed, as described, to allow pin e to pass through the slide; only one pin is seen in the drawing.

To enable others skilled in the art to construct and use my table, I proceed to describe it.

There are three wooden slides which mutually ride on each other, and are mutually connected—that is, the first to the second and the second to the third, by a pair of double angle-irons at each end of each slide piece. One-half of each angle-iron is received into the groove of the first slide, and the other half into the grooves of the second slide. There are four double angle-irons betwen the first and second slide, and four between the second and third slide. The pairs of grooves are placed at a considerable distance apart to give the effect of a frame-work to each slide, and to strengthen the bearings by a double line of movement, thus preventing the rocking and angular motion in the back-and-forth movements of the extension slides, so common in tables now in use. Holes are made through each wooden slide to insert a strong iron pin through both angle-irons by the hole O. This angle-iron is a casting made a little larger at one part, H, so as to be held firmly in the grooves, where it may be held fast by a strong iron pin in the hole O. The other half plays freely in its groove. The slides are made of kiln-dried wood, that the movement may not be impeded by swelling of the fiber of the wood. In the end view, Fig. 6, the large part is below; in that of Fig. 7 the largest part is above. The bumper B is made of hard wood. It is seen in Fig. 5 as protruded out of its groove, where it lies inside of the angle-irons, and controls their reach in their back-and-forth movement, or determines the lap of the wooden slides on each other. It may be lengthened or shortened to suit the design of the maker. If its length be increased by substituting a longer piece of wood, then the slide will not run back so far. If the bumper be shortened, then the length of the back movement is increased. There are shown in the drawing eight angle-irons; four are seen in the left-hand end view, Fig. 6, and four in the right-hand end view, Fig. 7. In Fig. 7 is the so-called fourth angle-iron, having a recess in its lower right-hand corner, as at N, Fig. 4. Two of these recessed angle-irons are contained in every set of three slides, both of which are seen in Fig. 7, on the right part of the figure, and are recognized by the lower end being destitute of the flange, and appear as if they had been clipped off at the bottom.

What I claim as my invention, and desire to secure by Letters Patent, is—

1. The double-flanged angle-iron H, provided with the shoulder $h$, as shown at Fig. 1, when used in the manner and for the purposes described and shown.

2. The combination of the angle-iron H, provided with the pin O, as shown at Fig. 2, with the angle iron H having the pin O and recess N, as shown at Fig. 4, for the uses and purposes set forth.

3. The combination of the angle-irons, as provided and shown at Figs. 2 and 4, with the bumper B and pins $e$ and $p$, for the uses and purposes substantially as shown and described.

4. The above in combination with the bars or slides A, when that part of the angle-iron H opposite the shoulder $h$ works in a T-shaped groove.

STEPHEN B. NASH.

Witnesses:
 THEODORE W. OTIS,
 R. J. CLAY.